(12) United States Patent
Yamamoto

(10) Patent No.: US 8,888,192 B2
(45) Date of Patent: Nov. 18, 2014

(54) SUPPORT STRUCTURE OF VEHICLE SEAT FRAME

(75) Inventor: Masato Yamamoto, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 36 days.

(21) Appl. No.: 13/170,689

(22) Filed: Jun. 28, 2011

(65) Prior Publication Data
US 2012/0007406 A1 Jan. 12, 2012

(30) Foreign Application Priority Data

Jul. 9, 2010 (JP) ................................. 2010-156573

(51) Int. Cl.
*B60N 2/68* (2006.01)
*B60N 2/42* (2006.01)
*B60N 2/06* (2006.01)
*B60N 2/427* (2006.01)

(52) U.S. Cl.
CPC ................ *B60N 2/68* (2013.01); *B60N 2/4221* (2013.01); *B60N 2/065* (2013.01); *B60N 2/682* (2013.01); *B60N 2/42709* (2013.01)
USPC ..................................................... 297/452.2

(58) Field of Classification Search
USPC ............... 297/452.18, 452.2, 452.56, 452.15, 297/232, 233, 248
See application file for complete search history.

(56) References Cited

U.S. PATENT DOCUMENTS

| 4,375,300 | A | * | 3/1983 | Long et al. .................... 297/232 |
| 4,395,011 | A |   | 7/1983 | Torta |
| 4,493,505 | A | * | 1/1985 | Yamawaki et al. ............. 296/63 |
| 4,623,114 | A | * | 11/1986 | Nishino ........................ 248/415 |
| 5,246,267 | A |   | 9/1993 | Nagashima et al. |
| 6,352,311 | B1 | * | 3/2002 | Hayotte ..................... 297/452.2 |
| 6,502,651 | B2 |   | 1/2003 | Zaczkowski et al. |

(Continued)

FOREIGN PATENT DOCUMENTS

| DE | 19758398 | 7/1998 |
| EP | 0979751 | 2/2000 |

(Continued)

OTHER PUBLICATIONS

U.S. Appl. No. 13/185,829 to Yoshiro Hara et al., which was filed on Jul. 19, 2011.

(Continued)

*Primary Examiner* — David R Dunn
*Assistant Examiner* — Timothy J Brindley
(74) *Attorney, Agent, or Firm* — Greenblum & Bernstein, P.L.C.

(57) ABSTRACT

A frame support structure of a vehicle seat includes a frame and a bracket supporting the frame on a vehicle floor. The frame extends toward a first side of a vehicle seat cushion in the seat width direction to extend the seat cushion to the direction of the first side. One end of the frame is connected to the first side of the vehicle seat cushion. The bracket includes a first support plate and a second support plate, which extends in a direction perpendicular to the first support plate. An edge of the second support plate is fixed to that of the first support plate on a side opposite from the first side. A plate face of the first support plate is fixed to a front or a rear surface of the frame and the second support plate is fixed to a lower surface of the horizontal frame.

6 Claims, 3 Drawing Sheets

(56) References Cited

U.S. PATENT DOCUMENTS

| | | | |
|---|---|---|---|
| 6,644,738 B2 * | 11/2003 | Williamson | 297/232 |
| 7,077,467 B2 * | 7/2006 | Wenzler | 297/188.08 |
| 2006/0290180 A1 | 12/2006 | Belair et al. | |
| 2009/0236882 A1 | 9/2009 | Yamada et al. | |
| 2010/0264717 A1 | 10/2010 | Fukuda | |

FOREIGN PATENT DOCUMENTS

| | | |
|---|---|---|
| JP | 07-017308 | 1/1995 |
| JP | 2000-184926 | 7/2000 |
| JP | 2006-321284 | 11/2006 |
| JP | 2009-248798 | 10/2009 |
| JP | 2009-286335 | 12/2009 |
| WO | 2009/066533 | 5/2009 |
| WO | 2009/066534 | 5/2009 |
| WO | 2009/147892 | 12/2009 |

OTHER PUBLICATIONS

Germany Office action, dated Aug. 13, 2014 along with an english translation thereof.

* cited by examiner

F I G . 2
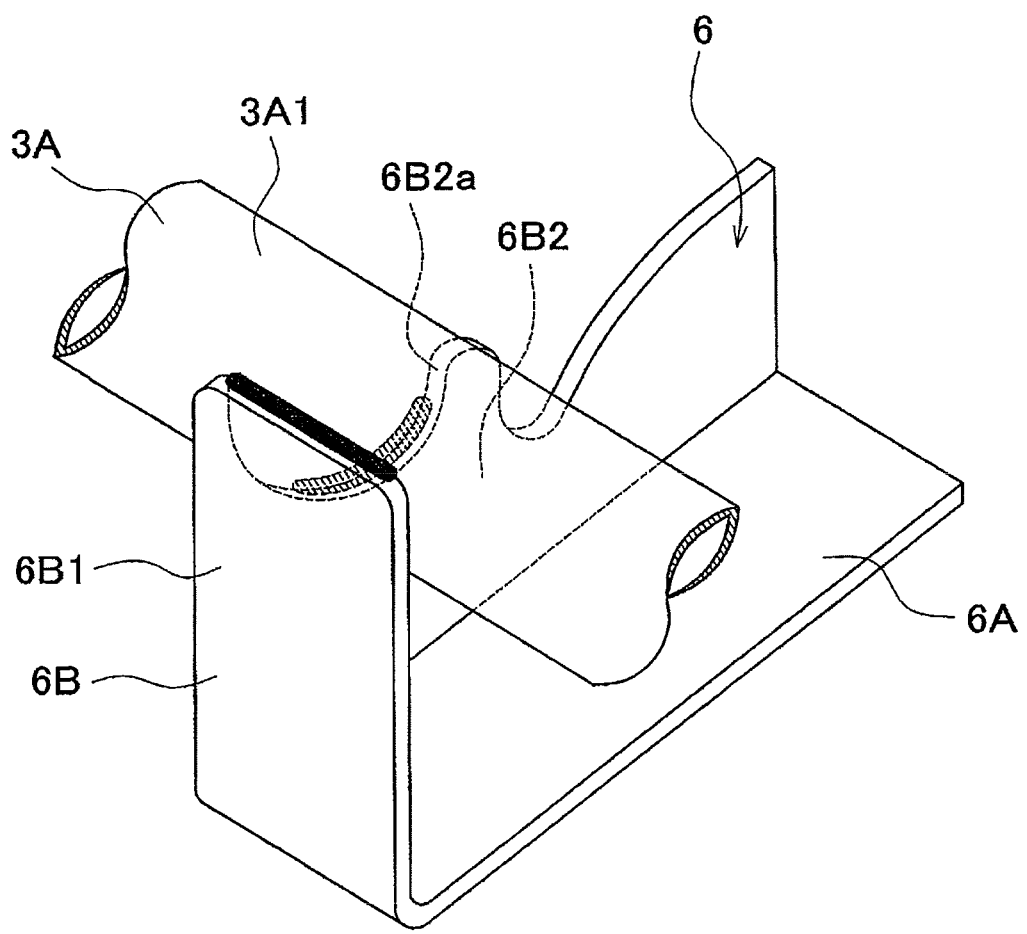

SUPPORT STRUCTURE OF VEHICLE SEAT FRAME

INCORPORATION BY REFERENCE

The disclosure of Japanese Patent Application No. 2010-156573 filed on Jul. 9, 2010 including the specification, drawings and abstract is incorporated herein by reference in its entirety.

BACKGROUND OF THE INVENTION

1. Field of the Invention

The invention relates to support structure of a vehicle seat frame. More particularly, the invention relates to a frame support structure of a vehicle seat cushion that supports a frame of the vehicle seat cushion from below with respect to a floor by a bracket.

2. Description of Related Art

Japanese Patent Application Publication No. 2000-184926 (JP-A-2000-184926) describes a frame structure of a seat cushion of a vehicle seat. The vehicle seat is configured as the wider seat of a 60/40 split rear seat of a vehicle. A front frame portion of a frame that is frame-shaped and forms the frame is supported from below on a floor via a bracket. The bracket is formed by a steel plate member that has been bent to have a U-shaped cross-section that is open toward the front. The front frame portion of the frame extends horizontally and is welded in a saucer-shaped concave portion formed on an upper edge portion of both sides of the U-shape.

However, conventional brackets are formed with a U-shaped cross-section and is thus structurally strong and resists deformation toward the front. Therefore, if a large load that results in forced displacement of the front frame portion toward the front is input to a fixed portion of the bracket and the front frame portion during a vehicle collision, for example, stress will concentration at the fixed portion, which may cause the front frame portion to greatly bend and deform forward, and ultimately crack, in a localized area.

SUMMARY OF THE INVENTION

This invention makes bending deformation of a frame of a vehicle seat cushion gradual when a large load that results in forced forward displacement of the frame is input to a fixed portion of the frame and a bracket.

One aspect of the invention relates to a frame support structure of a vehicle seat. The frame support structure includes: a frame of a vehicle seat cushion that includes a horizontal frame extending in a seat width direction; and a bracket that supports the frame from below on the vehicle floor. The frame extends toward a first side of the vehicle seat cushion in the seat width direction to extend the seat cushion of a center seat for one person to the direction of the first side of the vehicle seat cushion. A buckle of a seat belt apparatus provided for the center seat is attached to the first side of the vehicle seat cushion. One end of the frame is connected to the first side of the vehicle seat cushion. Further, the bracket includes a first support plate and a second support plate which extends in a direction perpendicular to the first support plate, wherein an edge of the second support plate is fixed to an edge of the first support plate on a side opposite from the first side of the vehicle seat cushion such that the first support plate and the second support plate form a general L-shape when viewed from above. One part of a plate face of the first support plate is fixed to a front surface or a rear surface of the horizontal frame and a part of the second support plate is fixed to a lower surface of the horizontal frame.

According to this aspect, the bracket is formed in a general L-shape when viewed from above, and the edge of the second support plate that is fixed to the lower surface of the horizontal frame is fixed to the edge portion of the first support structure that is on the side opposite from the first side of the vehicle seat cushion. As a result, the first support plate easily deforms by rotating toward the front of the seat around the fixed portion of the first support plate and the second support plate, when a load toward the front of the seat is input to the portion on the side close to the first side (i.e., close to the center seat). Therefore, when the horizontal frame receives a large load that forces the displacement of the frame toward the front of the seat from a buckle arranged at the center seat, the bracket receives the force of the forced displacement of the horizontal frame, and the first support plate deforms toward the front along with that deformation. As a result, bending deformation of the frame is able to be gradual and not localized, so the frame will not easily crack. Incidentally, one example of a case of "when the horizontal frame receives a large load that forces the displacement of the frame toward the front of the seat from a buckle arranged at the center seat" is when a load of an occupant seated in the center seat is input as a large load with momentum that is applied toward the front of the seat to the frame via the buckle of the seat belt apparatus of the seat as a result of a frontal collision of the vehicle.

In the aspect described above, the plate face of the first support plate may be fixed to the front surface of the horizontal frame.

According to this structure, the plate face of the first support plate is fixed to the front surface of the horizontal frame. Therefore, when a large load that forces the displacement of the frame toward the front of the seat is input to the horizontal frame, this load is more easily input to the first support plate, so the first support plate is better able to follow the deformation of the horizontal frame, which facilitates the gradual bending deformation of the frame.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an enlarged perspective view of a fixed portion of a bracket and a horizontal frame;

DETAILED DESCRIPTION OF EMBODIMENTS

An example embodiment of the invention will be described below with reference to the accompanying drawings.

Figure 1:
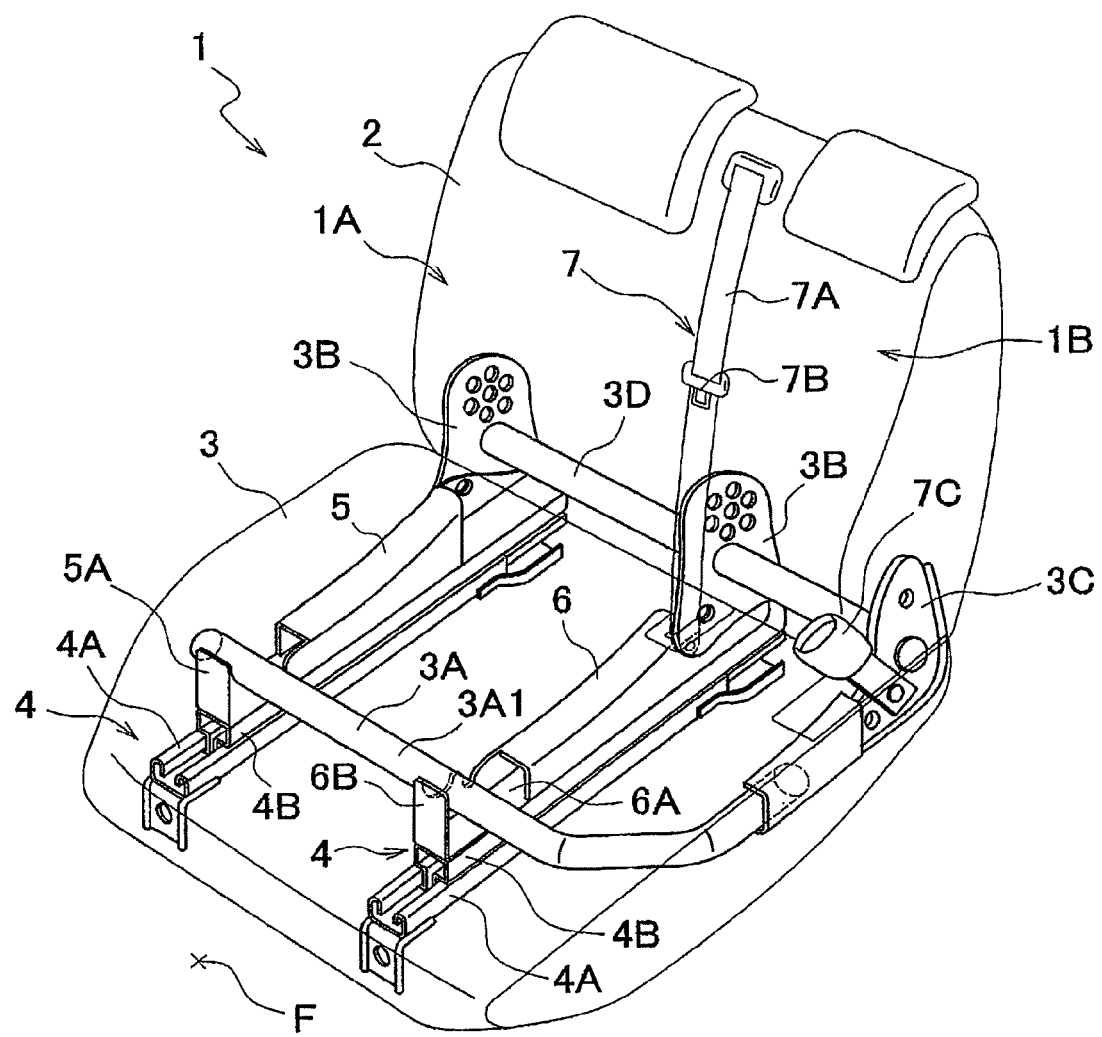
FIG. 1 is a perspective view of a frame support structure of a vehicle seat cushion according to one example embodiment of the invention.
Figure 3:
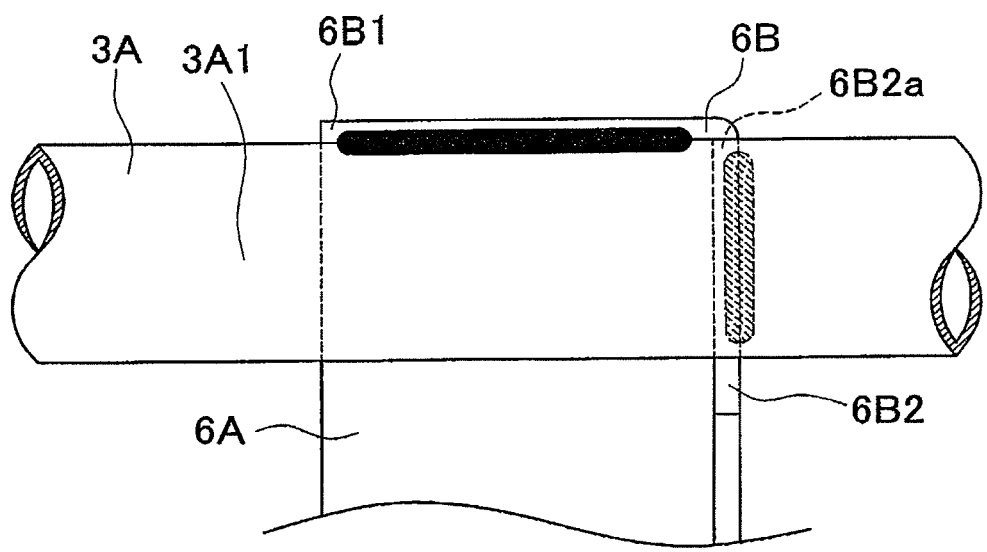
FIG. 3 is a plan view of FIG. 2.

First, a frame support structure of a vehicle seat cushion according to an example embodiment will be described with reference to FIGS. 1 to 4. As shown in FIG. 1, the frame support structure of the vehicle seat cushion in this example embodiment is a structure in which a front frame (i.e., a pipe frame 3A) of a seat cushion 3 of a vehicle seat 1 is supported from below on a floor F by a bracket 6. Here, the vehicle seat 1 is configured as the wider seat of a 60/40 split rear seat of a vehicle, and includes a seat back 2 that serves as a backrest and a seat cushion 3 that serves as a sitting portion. Here, the seat cushion 3 serves as the vehicle seat cushion of the invention.

The vehicle seat 1 is configured as a two-person seat that includes a window seat 1A that is arranged as a window seat of the vehicle, and a center seat 1B that is arranged between the window seat 1A and another adjacent seat, not shown, provided in the same row. The frame structure of the seat back 2 and the seat cushion 3 of the center seat 1B is integrally formed with the frame structure of the seat back 2 and the seat cushion 3 of the window seat 1A, and is formed by a frame portion that extends toward the inside in the seat width direction (i.e., toward the right in the drawing) from the frame structure of the seat back 2 and the seat cushion 3 of the window seat 1A. In this way, the center seat 1B is continuous from the window seat 1A.

The window seat 1A generally has the same width as the other seat, not shown, that is adjacent in the same row described above, and the center seat 1B is made narrower, with a horizontal width ratio to the window seat 1A of 20/40. The seat cushion 3 of the center seat 1B is supported in a cantilever-like manner with respect to the floor F by the pipe frame 3A that forms a front frame that extends from the seat cushion 3 of the window seat 1A being supported from below by brackets 5 and 6 at an area where the window seat 1A is formed. Here, the pipe frame 3A corresponds to the frame of the invention. The frame structure of the seat back 2 of the window seat 1A and the center seat 1B may have a conventional structure such as that described in Japanese Patent Application Publication No. 2006-321284 (JP-A-2006-321284), for example. Accordingly, descriptions and drawings of the frame structure will be omitted.

The vehicle seat 1 slides on the floor F in the longitudinal direction of the vehicle via a pair of left and right slider mechanisms 4 provided at the lower portion of the seat cushion 3 of the window seat 1A. The slider mechanisms 4 include a pair of slide rails 4A, a pair of sliders 4B, and a locking device that is not shown. The slide rails 4A extend in the longitudinal direction of the vehicle and are fixed to the floor F. The sliders 4B are assembled to the slide rails 4A so as to be able to slide in the vehicle longitudinal direction, and are provided fixed to the bottom of the frame of the seat cushion 3. The locking device locks the sliders 4B to the slide rails 4A so that they will not slide.

The frame of the seat cushion 3 is formed by the pipe frame 3A that is made of a circular steel pipe member that forms the front frame, the brackets 5 and 6 that form the frame of both side portions of the seat cushion 3 of the window seat 1A, side frames 3B that are integrally connected to the rear end portions of the brackets 5 and 6, a side frame 3C that forms the frame of the side portion on the vehicle inside (i.e., the right side in the drawing) of the center seat 1B, and a reinforcing pipe 3D that is provided through the side frames 3B and 3C and is integrally connected with the side frame 3B and 3C. A bracket 5 provided on the left side in the drawing (i.e., on the vehicle outside) is formed from a single steel plate member that extends in longitudinal direction of the vehicle and has been press-formed into a predetermined shape. The bracket 5 is fixed onto an upper surface portion of the slider 4B of the slider mechanism 4. An upright wall-shaped support portion 5A that is formed on the front end portion of the bracket 5 is welded to both a lower surface and a front surface near an end portion of a horizontal frame 3A1 that extends straight in the seat width direction of the pipe frame 3A. As a result, the end on the vehicle outside of the pipe frame 3A is firmly supported from below by the bracket 5.

The bracket 6 that is arranged on the right side of the drawing (i.e., on the vehicle inside) may also be formed from a single steel plate that extends in the longitudinal direction of the vehicle and has been press-formed into a prescribed shape. The bracket 6 is fixed onto the upper surface of the slider 4B. An upright wall-shaped support portion 6B that is formed on a front end of the bracket 6 is welded to both the lower surface and the front surface of the horizontal frame 3A1 of the pipe frame 3A that cuts across above the bracket 6. As a result, the portion of the horizontal frame 3A1 of the pipe frame 3A that is on the side next to the center seat 1B is firmly supported from below by the bracket 6.

More specifically, as shown in FIG. 2, the support portion 6B includes a bottom plate 6A that is attached on an upper surface portion of the slider 4B (i.e., the bottom plate 6A is connected to the floor F) described above (see FIG. 1), a first support plate 6B1 that is bent upward so as to stand upright from a front end side edge portion of the bottom plate 6A, and a second support plate 6B2 that is bent upward so as to stand upright from an edge portion on the vehicle outside of the bottom plate 6A. The edge of the first support plate 6B1 is welded to that of the second support plate 6B2 such that the first support plate 6B1 and the second support plate 6B2 form an L shape when viewed from above (see FIG. 3). The first support plate 6B1 abuts against the front surface of the horizontal frame 3A1 and the upper edge of the first support plate 6B1 is welded to the front surface of the horizontal frame 3A1. The second support plate 6B2 includes a concave portion 6B2a that accommodates and is fixed to the lower surface of the horizontal frame 3A1, and that is formed on the upper edge of the second support plate 6B2. The lower surface of the horizontal frame 3A1 is welded to the inside of the concave portion 6B2a.

The second support plate 6B2 is structured to deform relatively easily in the seat width direction while being relatively resistant to deformation in the seat longitudinal direction, because the second support plate 6B2 extends in the seat longitudinal direction. In addition, the first support plate 6B1 is structured so as to deform relatively easily in the seat longitudinal direction while being relatively resistant to deforming in the seat width direction, because the first support plate 6B1 extends in the seat width direction. Also, the edge of the first support plate 6B1 is fixed to that of the second support plate 6B2 so that the first support plate 6B1 and the second support plate 6B2 form an L-shape when viewed from above. At this fixed portion, the second support plate 6B2 is also relatively resistant to deforming in the seat width, direction, and the first support plate 6B1 is also relatively resistant to deforming in the seat longitudinal direction.

As a result, bracket 6 provides stronger support for the pipe frame 3A from both below and the front in the direction toward the outside in the vehicle seat direction from the second support plate 6B2, and weaker support in the opposite direction (i.e., the inside in the vehicle seat direction).

Returning now to FIG. 1, the side frames 3B are connected to the rear ends of the brackets 5 and 6. The lower end portion of each side frame, not shown, of the seat back 2 is connected via a reclining device, also not shown, to the upper end portion of the corresponding side frame 3B. Also, a rear end portion of the side frame 3C that forms the frame of the side portion on the vehicle inside (i.e., the right side in the drawing) of the center seat 1B is connected to the reinforcing pipe 3D that is inserted through the side portions 3B in the seat width direction, and a front end portion of the side frame 3C is connected to an end portion of the pipe frame 3A on the vehicle inside that is bent toward the rear.

A lower end portion of a side frame, not shown, that forms the frame on the vehicle inside of the seat back 2 of the center seat 1B is pivotally connected to an upper end portion on the rear end side of the side frame 3C. Accordingly, the seat back angle of the seat back 2 of the center seat 1B may be fixed or changed together with the seat back 2 of the window seat 1A. Also, a buckle 7C of a seat belt apparatus 7 that is provided for the center seat 1B is mounted to a lower end portion on the rear end side of the side frame 3C.

The seat belt apparatus 7 is structured so that a seat belt 7A that wraps around the body of a seated occupant is pulled out from an outlet set at the top of the shoulder portion on the vehicle outside (i.e., the left side in the drawing) of the center seat 1B. The tip end portion of the seat belt 7A that is pulled out is fixed to a side portion of the side frame 3B arranged on a side portion on the vehicle inside of the window seat 1A. The seat belt 7A of the seat belt apparatus 7 is pulled out and a tongue 7B through which the seat belt 7A passes is fastened to the buckle 7C, thereby keeping the seat belt 7A wrapped around the body of the seated occupant.

Figure 4:
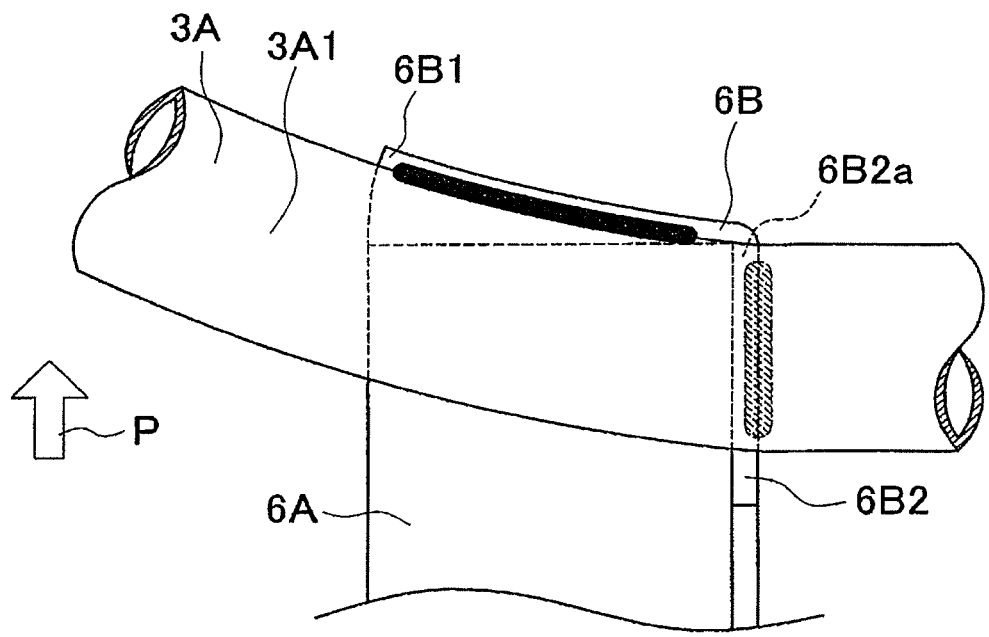
FIG. 4 is a plane view of deformation of the horizontal frame and the bracket when a large load is input.

Therefore, with the vehicle seat 1, a load P (see FIG. 4) that acts to throw an occupant seated in the center seat 1B forward when the vehicle is involved in a frontal collision forces the displacement of the pipe frame 3A toward the front of the seat, via the buckle 7C of the seat belt apparatus 7 of the seat. In this case, the pipe frame 3A deforms by bending toward the front of the seat, with the fixed portion of the pipe frame 3A and the bracket 6 that is arranged on the vehicle inside of the window seat 1A as the base point, as shown in FIG. 4.

Mote specifically, the pipe frame 3A deforms in a manner in which the first support plate 6B1 bends toward the front of the seat around the fixed portion of the pipe frame 3A and the second support plate 6B2, which has greater support strength against a load applied to the seat front side of the bracket 6. That is, the bracket 6 is formed weaker so that it easily deforms toward the front of the seat. In comparison with a structure in which this area does not deform when the load P is received, the above-described structure enables the bending point at which the bracket 6 bends to be positioned farther to the outside in the seat width direction, so that bending deformation is gradual. Therefore, even if the pipe frame 3A receives a large load, and as a result, bends and deforms, the pipe frame 3A will not easily crack, so the load P that is input may be received by the bracket 6 and the pipe frame 3A that will not easily break even if it deforms.

In addition, the bracket 6 is formed such that the first support plate 6B1 is fixed to the front surface of the horizontal frame 3A1. Therefore, compared with a structure in which the first support plate 6B1 is fixed to the rear surface of the horizontal frame 3A1, the load P is more easily input from the horizontal frame 3A1 to the first support plate 6B1, so that the first support plate 6B1 is better able to follow the deformation of the horizontal frame 3A1, which facilitates the gradual bending deformation of the pipe frame 3A.

Although the invention has been described in the context of one example embodiment, the invention may also be implemented through various alternative embodiments. For example, while the first support plate 6B1 is fixed to the front surface of the horizontal frame 3A1 in the described embodiment, the first support plate 6B1 may instead be fixed to the rear surface of the horizontal frame 3A1. However, in this case, if the horizontal frame 3A1 is not firmly fixed to the first support plate 6B1, the fixing may come apart when a large load is applied from the horizontal frame 3A1 toward the seat front side of the first support plate 6B1, so the fixing strength must be, increased.

Further, in the example embodiment described above, the pipe frame 3A that is made of a circular steel pipe member is described as a member that corresponds to the frame of the invention. The cross-sectional shape of the frame, however, may be any suitable shape, for example, square. In addition, the frame may be made of a solid pole instead of a hollow pipe. In addition, although the lengths of the reinforcing pipe 3D and the pipe frame 3A are sufficient to form the frame of the window seat 1A as well as the frame structure of the center seat 1B in the example embodiment described, the frame structure of the center seat may also be formed by connecting a separate member to the frame structure of the window seat 1A".

What is claimed is:

1. A frame support structure of a vehicle seat mounted on a vehicle floor, comprising:
   a frame of a vehicle seat cushion that includes a horizontal frame extending in a seat width direction; and
   a bracket that supports the frame from below on the vehicle floor and which has a major dimension of the bracket that extends in a direction parallel to a top side of the seat cushion extending in a seat length direction, wherein
   the frame extends toward a first side of the vehicle seat cushion in the seat width direction to extend the seat cushion of a center seat for one person to the direction of the first side of the vehicle seat cushion;
   a buckle of a seat belt apparatus provided for the center seat is attached to the first side of the vehicle seat cushion;
   one end of the frame is connected to the first side of the vehicle seat cushion;
   the bracket includes a first support plate and a second support plate, which extends in a direction perpendicular to the first support plate wherein an edge of the second support plate is fixed to an edge of the first support plate on a side opposite from the first side of the vehicle seat cushion such that the first support plate and the second support plate form a general L-shape when viewed from above; and
   one part of a plate face of the first support plate is fixed to a front surface or a rear surface of the horizontal frame and a part of the second support plate is fixed to a lower surface of the horizontal frame,
   wherein the bracket includes a bottom plate connected to the vehicle floor, and the first support plate is bent upward so as to stand upright from an edge of the bottom plate and the second support plate is bent upward so as to stand upright from another edge of the bottom plate.

2. The frame support structure of a vehicle seat cushion according to claim 1, wherein the plate face of the first support plate is fixed to the front surface of the horizontal frame.

3. The frame support structure of a vehicle seat cushion according to claim 1, wherein the second support plate includes a concave portion that accommodates and is fixed to the lower surface of the horizontal frame, and that is formed on an upper edge of the second support plate.

4. A frame support structure of a vehicle seat mounted on a vehicle floor, comprising:
   a frame of a vehicle seat cushion that includes a horizontal frame extending in a seat width direction; and
   a bracket that supports the frame from below on the vehicle floor and which has a major dimension of the bracket that extends in a direction parallel to a top side of the seat cushion extending in a seat length direction, wherein
   the frame extends toward a first side of the vehicle seat cushion in the seat width direction to extend the seat cushion of a center seat for one person to the direction of the first side of the vehicle seat cushion;

a buckle of a seat belt apparatus provided for the center seat is attached to the first side of the vehicle seat cushion;

one end of the frame is connected to the first side of the vehicle seat cushion;

the bracket includes a first support plate and a second support plate, which extends in a direction perpendicular to the first support plate wherein an edge of the second support plate is fixed to an edge of the first support plate on a side opposite from the first side of the vehicle seat cushion such that the first support plate and the second support plate form a general L-shape when viewed from above; and one part of a plate face of the first support plate is fixed to a front surface or a rear surface of the horizontal frame and a part of the second support plate is fixed to a lower surface of the horizontal frame wherein the bracket is attached at a position other than an end of a side of the frame.

5. The frame support structure of a vehicle seat cushion according to claim 4, wherein the plate face of the first support plate is fixed to the front surface of the horizontal frame.

6. The frame support structure of a vehicle seat cushion according to claim 4, wherein the second support plate includes a concave portion that accommodates and is fixed to the lower surface of the horizontal frame, and that is formed on an upper edge of the second support plate.

* * * * *